Sept. 15, 1936. E. L. SCHELLENS 2,054,206
FIRELESS COOKER
Filed Aug. 12, 1933
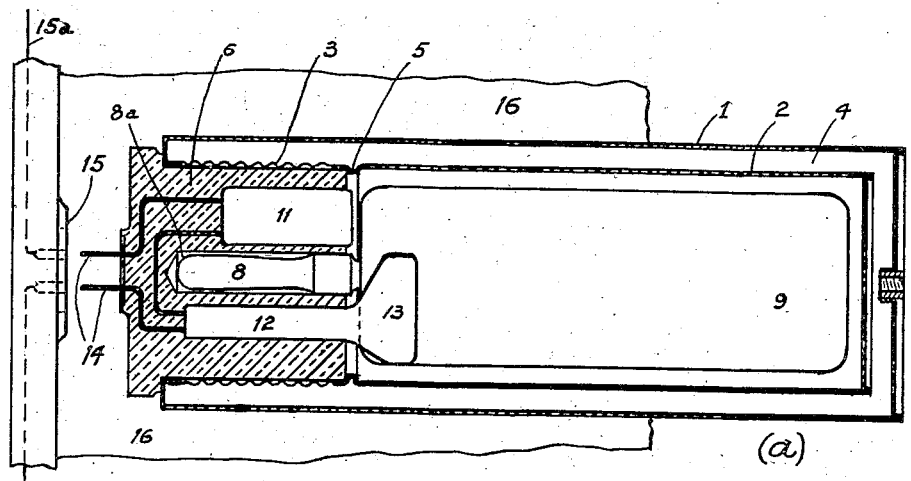
Fig. 1.
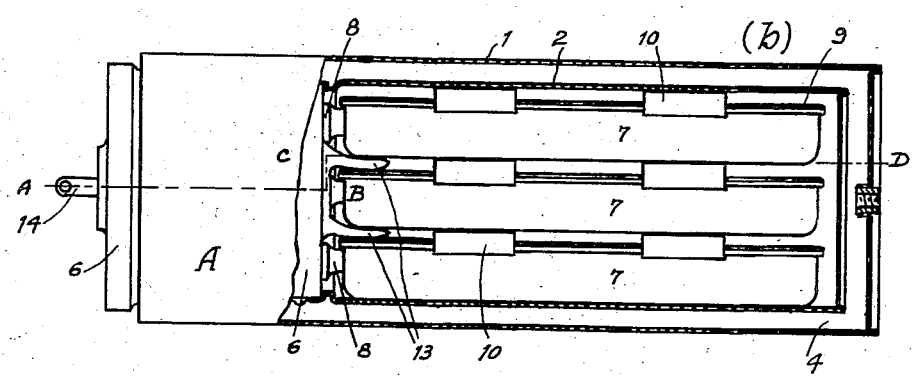
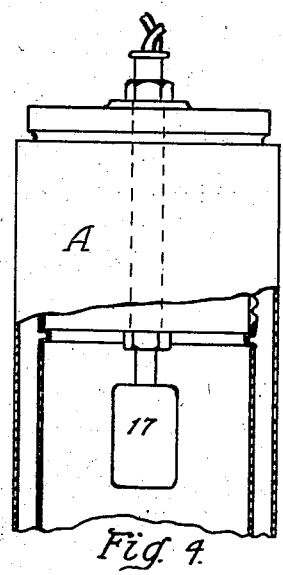
Fig. 4.
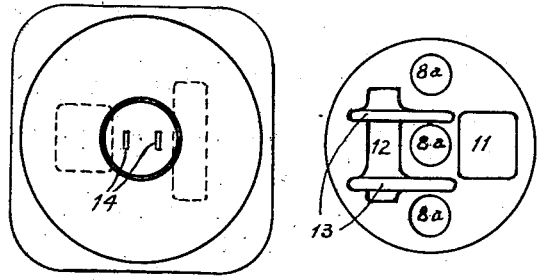
Fig. 2. Fig. 3.
INVENTOR.
Eugene L. Schellens Patented Sept. 15, 1936

2,054,206

UNITED STATES PATENT OFFICE 2,054,206

FIRELESS COOKER

Eugene L. Schellens, Ridgewood, N. J., assignor to The Shellwood-Johnson Company, Paterson, N. J., a corporation of New Jersey Application August 12, 1933, Serial No. 684,815

2 Claims. (Cl. 219—35)

An object of this invention is to provide new and improved means, whereby heat is introduced into thermally insulated vessels.

A further object of this invention is to introduce heat into such insulated vessels, avoiding the necessity of making heating connections through the body walls, thereby simplifying the cleaning and handling of such vessels, and minimizing possible damage to the heating means and its contents.

Further advantages of my invention will be apparent from the accompanying description and drawing.

Although steam, hot water, and other media may be employed, for heating the contents of such vessels, it is neither necessary nor permissible to here show more than one such arrangement, and I prefer, and have accordingly selected for the purpose of this application, electrical means for providing the heat required.

Furthermore, the form, size, and uses of heat insulated vessels varies widely with the purpose for which each is intended. The arrangement which I have selected for this exemplification is that of a container of convenient form for holding several food receptacles in which various kinds of food are to be heated at the same time.

Referring, now, to the drawing, Fig. 1, view (a), is a plan view, and view (b) is a partly sectional view of the insulated vessel A constructed according to this invention, view (a) being a plan view along lines A—B—C—D of view (b), but showing elements 11 and 12 and handle 8 in full; and view (b) is an elevation view, showing the walls of the vessel A partly cut away along the center line.

Fig. 2 is a view of the left end of Fig. 1.

Fig. 3 is a right hand end view of the closure plug of Figure 1.

Fig. 4 is a partly sectional view of the vessel A shown in Fig. 1, but embodying a modification of this invention.

Referring more particularly to the drawing, Fig. 1, view (a) shows an outer shell 1 of vessel A surrounding an inner shell 2 a portion of which is preferably very thin and of corrugated form as seen at 3. Shell 1 is suitably insulated from shell 2 preferably by evacuating the intervening space 4. In the example shown by this figure, shell 1 and the straight portion of shell 2 are preferably made rectangular in cross section as indicated in Fig. 2, the corrugated portion 3 of shell 2 being preferably cylindrical. A seat 5 is suitably located inside of shell 2 and upon which closure plug 6 seats.

Within shell 2 I show a plurality of receptacles 7 adapted to hold food, and the handles 8 of which extend into apertures 8a in plug 6.

In this example I have provided for receptacles 7 covers 9 held in place by any suitable means as 10, which also form suitable spacing means between receptacles 7.

Within plug 6 is assembled a thermostatic element 11 of any suitable type or design, adjustable or non-adjustable, also a heating element 12 which also is of any suitable construction, and which may have one or more portions extending beyond the inner end of plug 6. For the purpose of this application, I have shown heating element 12 provided with two such extensions 13 adapted to occupy the spaces between receptacles 7 to assist the heat transfer thereto, and therefore to their contents.

Thermostatic element 11 and heating element 12 are suitably electrically connected together, and with extensions 14 for connection to an outside source of current, such as to the usual baseboard type of attachment 15, and which, in turn may, as shown, be located in the back of a kitchen cabinet or elsewhere, convenient to the shelf or other place of storage 16 for vessel A.

It is well known that the conventional fireless cooker is very cumbersome and, therefore very inconvenient for transportation, washing and handling. The usual type of insulation employed is cork, mineral wool, or any of many other substances, well known in the art. This type of insulation requires thick walls, necessitating a bulky structure. Moreover, on a cooker of the above-mentioned type, the heater connections are made through the walls, as is well known. Such construction, apart from its inconvenient and bulky form intensifies the above-mentioned difficulties connected with transportation, cleaning and handling, and renders the entire device a more or less stationary adjunct of the kitchen.

My experiments have disclosed that for equal thermal efficiency and volumetric capacity, the bulk of the conventionally insulated article is substantially nine times that of the vacuum insulated type of this invention.

Furthermore, if the electrical connections are embodied in the closure plug, as herein shown, instead of being connected to the main portion of the device, as with the usual construction, the further advantage is obtained of additional convenience in washing, handling, cleaning and portability.

Fig. 4 is, as will be apparent, a modification of Fig. 1, inasmuch as it shows an immersion type heating element 17 which is more suitable for heating fluids or other contents in bulk.

It will be readily seen that the heating element of Fig. 1 or Fig. 4 can be used with or without a thermostatic element, such as 11, without departing from the nature of this invention.

It will be clear from the foregoing that if there be constructed a vacuum-insulated vessel and with which is combined the principle of having heating and thermostatic elements connected with the cover means, there will result a device of extreme efficiency reliability, lightness, portability, and convenience not present in the conventional type.

Furthermore, it is to be distinctly understood that while I have hereinbefore shown and described several embodiments of this invention, it is, nevertheless, subject to many minor modifications in the form and arrangement of the various parts without departing from the nature of this invention, and I accordingly reserve the right to adopt all such changes and modifications as may legitimately come within the spirit and scope of this invention as claimed.

What I claim is:

1. A portable fireless cooking utensil of the kind described, comprising a container formed with a deep wide mouth for access to its interior chamber, and having double shelled end and side walls substantially continuously surrounding such chamber and the full depth of its wide mouth, and with the space enclosed by said double shelled wall permanently evacuated to insulate the container and confine heat within its chamber for maintaining hot the contents thereof, in combination with a deep stopper shaped to extend longitudinally snugly within the container mouth to occupy the full depth of the mouth and close the same and removable therefrom at will to permit access to such chamber, the evacuated double shelled side wall of the container being extended to surround the full inserted depth of such stopper, an electrical heating element combined with and removable with said stopper and interiorly exposed within the container for heating the contents of such chamber, an electrical heating connection mounted on and removable with the stopper and extended through the stopper for connecting the heating element with an exterior source of current, and an elongated receptacle adapted to extend flatwise longitudinally within the chamber and to be removable therefrom with the contents to be heated, and the heating element being extended to project longitudinally from the stopper into overlapping relation to said receptacle.

2. A portable fireless cooking utensil of the kind described, comprising a container formed with a wide mouth for access to its interior chamber, and having a double shelled wall substantially continuously surrounding such chamber and its wide mouth, and with the space enclosed by said double shelled wall permanently evacuated to insulate the container and confine heat within its chamber for maintaining hot the contents thereof, in combination with receptacles for the contents to be maintained hot, such receptacles extending flatwise longitudinally into the chamber, a stopper adapted to be fitted snugly within and to occupy the container mouth to close the same and removable therefrom at will to permit access to such chamber, an electrical heating element combined with and removable with said stopper and having a longitudinal extension or fin interiorly exposed within the container and extending between such receptacles for heating the contents thereof, and an electrical heating connection mounted on the stopper and adapted for connecting the heating element with an exterior source of current and extended through the stopper so as to be removable when the stopper is removed.

EUGENE L. SCHELLENS.